March 11, 1969    B. C. WIGGIN    3,431,781
CLINICAL THERMOMETER
Filed July 18, 1966
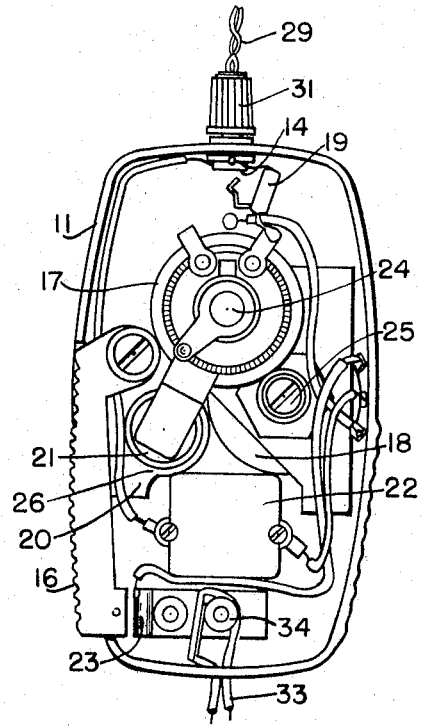
FIG. 1
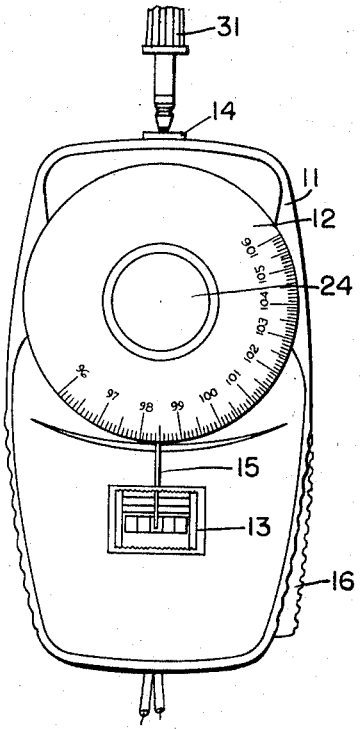
FIG. 2
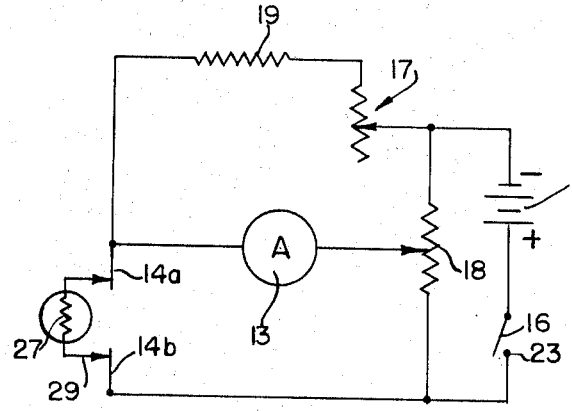
FIG. 3
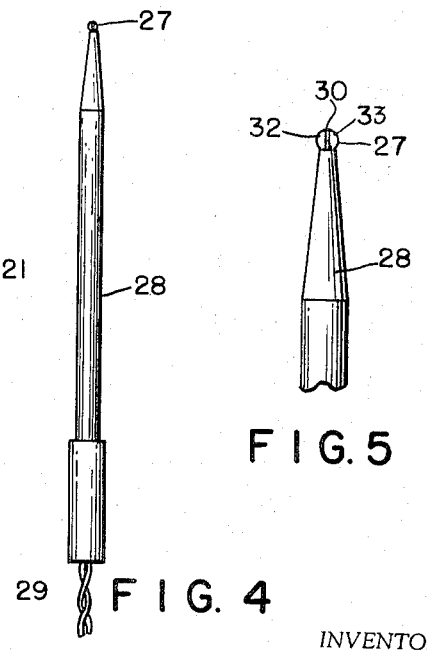
FIG. 4
FIG. 5
INVENTOR.
BLANTON C. WIGGIN
BY Roberts, Cushman & Grover
ATTORNEYS United States Patent Office 3,431,781
Patented Mar. 11, 1969

3,431,781
CLINICAL THERMOMETER
Blanton C. Wiggin, Wellesley Hills, Mass., assignor to Advanced Instruments Inc., Newton Highlands, Mass., a corporation of Massachusetts
Filed July 18, 1966, Ser. No. 565,990
U.S. Cl. 73—362
Int. Cl. G01k 5/18
2 Claims

ABSTRACT OF THE DISCLOSURE

An electrical resistance thermometer having a sterilizable thermistor sensing unit which is adapted to be standardized by abrasion and thereby made interchangeable in use. A compact, casing-housed, null balance circuit is provided with a potentiometer-adjusting reading dial and an external pressure switch, to actuate and manipulate the thermometer for temperature reading while held in the hand.

---

This invention relates to a clinical thermometer of the electrical resistance type. More particularly, this invention relates to a clinical thermometer which utilizes a thermistor as the sensing element, and which is distinguished further by a simple, compact, rugged, battery powered, null-balance adjusting temperature reading device.

This invention also relates to a method for calibrating thermistor sensing units mechanically so that a plurality of such units may be employed interchangeably with a single reading device without the necessity of recalibrating the reading device each time the sensing unit is changed.

There has long been a need for a simple device to replace the ordinary mercury clinical thermometer, especially for hospital use. Mercury thermometers are not entirely satisfactory because they are easily lost or broken due to their small size and fragility, and because they are difficult to sterilize in that they cannot be exposed to elevated temperatures.

There has not heretofore been successfully developed a practical electrical device to replace the mercury thermometer for general hospital use, and answering to the requirements that it be rugged, simple, small, light, easy to read, easy to use, inexpensive, accurate and stable.

It has been proposed to employ for this purpose an ammeter device, or more particularly a device utilizing an ammeter as the temperature indicator and with the dial of the ammeter being marked off in degrees of temperature rather than in amperes of current. But such a device is objectionable in that it lacks retentivity, that is, a temperature reading can only be made while the sensing unit is in contact with the patient. Thus a thermometer device of the ammeter type could be less convenient and less desirable even than the ordinary mercury clinical thermometer, in that with it there could not be followed the usual hospital-prescribed practice of reading the thermometer, recording the reading on the patient's chart, and then comparing the record again with the thermometer as a check on the correctness of the reading and recording, all of which obviously requires a time delay and as well a separation of the thermometer from the patient.

A further difficulty with an ammeter type of thermometer device would be that over the normally prolonged time of use it would develop inaccuracies to an increasing degree, whether from the stress of normal use such as may increase the friction at the pivot bearings, or from the incidence of dust and dirt having the same effect, and which must be counted on in view of the random handling to which the thermometer devices here concerned are routinely subject.

A further and obvious difficulty with a practical or portable embodiment of the ammeter type device would be the inaccuracies in its readings due to variation in the voltage of the battery power supply.

Also making an ammeter device impractical for the thermometer application would be the necessity for its frequent calibration, preferably at several temperature levels, for lack of an indication otherwise of error or malfunction in its operation. Similarly, any random drift that may develop between calibrations would go undetected.

Yet another obstacle in the way of the development of a practical electrical device would be the unavailability of uniform or interchangeable thermometers, requiring that a given sensing unit be matched with a given reading unit, presenting difficulties whenever the sensing unit of such a set is to be replaced, and introducing the risk of mismatching whenever it is to be separated from the reading unit, as for sterilizing.

It is highly advantageous to medical and hospital practice to have the patient-contacting or temperature sensing elements of the thermometer devices here concerned replaceable or susceptible of substituting one for another, in combination with the reading unit. For the replacement capability would allow the desired sterilization of the sensing units after each use, and would permit also the assigning to each patient of one or more sensing units for his own use, and to each nurse or intern of a reading unit that he can retain for his own use.

It is an object of this invention, therefore, to provide a thermometer device having a sterilizable thermistor sensing unit distinguished by a predetermined resistance at a given temperature and by a predetermined change in resistance for a given change in temperature, whereby the sensing unit may be interchanged with other sensing units in combination with the reading unit of the thermometer device, and whereby the thermometer device or more particularly the reading unit will not require recalibration.

It is a further object of this invention to provide a simple, inexpensive and rugged temperature reading unit which can be carried conveniently in a uniform pocket, and which retains the indicated temperature reading until such time as it is intentionally reset.

In the drawings:
FIG. 1 is a plan view of elements of the reading unit as seen from the back with the cover removed;
FIG. 2 is a plan view of the front of the reading device;
FIG. 3 is a wiring diagram;
FIG. 4 is a full scale plan view of the thermistor sensing unit; and
FIG. 5 is an enlargement of the tip portion of the sensing unit.

In the illustrated embodiment the thermometer device consists of a case 11 which is compact—it may be approximately 4″ x 2½″ x 1″—and which is shaped to fit conveniently into the palm of the hand. At the front of the case there is mounted a large knurled dial 12 of say 2″ diameter, and there is exposed the face of a null meter 13. Through the casing wall also there is mounted a connector 14 for the plug 31 hereinafter referred to.

Dial 12 is scaled in degrees of temperature within the clinical range, say from 96° to 106° F., and by virtue of its relatively large size is readily marked off in and is as easily read to the nearest tenth of a degree, as against an index line 15. Case 11 is recessed at its opposite sides below and to expose the periphery of dial 12, for easy manipulation or finger contact with the same. An actuating switch 16 protrudes through the side of case 11 and is arranged as shown in FIG. 1 to be shiftable to engage contact 23 and energize the circuit of the device merely by squeezing the hand holding the instrument.

Within the casing are arranged two potentiometers or variable resistors 17, 18 of, say 150 ohms; a resistor 19 of say 360+10 ohms; a preferably alkaline or mercury cell battery 21 of, say, 1.5 volts; housing body 22 of ammeter 13; and the contact 23 engaged by actuating switch 16.

Potentiometer 17 is mounted with dial 12 on, and is connected directly to it by, shaft 24, whereby that potentiometer serves as a temperature indicating variable resistance. Potentiometer 18 is mounted between the casing and an adjusting screw 25, and is arranged to function as the calibrating variable resistance. Resistor 19 is a fixed resistance series coupled to potentiometer 18 to balance the thermistor 27 hereinafter to be described.

As shown in the wiring diagram of FIG. 3, one terminal 14a of connector 14 is connected in parallel to fixed resistor 19 and to one terminal of null detector 13. Resistor 19 in turn is connected in series to one end of the coil of potentiometer 17. The variable center tap of potentiometer 17 is connected to the negative terminal of battery 21 and to one end of the coil of calibrating potentiometer 18. The other end of the coil of calibrating potentiometer 18 is connected to the other terminal 14b of connector 14 and to contact 23 of switch 16. The variable center tap of potentiometer 18 is connected to the second terminal of null detector 13. Switch 16 is connected to the positive terminal of battery 21 through spring contactor 20 and frame 26. Null detector 13 is an ammeter the non-current position of whose pointer is at center scale, and which deflects when a current is passed therethrough responsive to the magnitude and direction of that current.

The thermistor sensing unit consists of a thermistor 27 mounted at the end of a hollow probe 28. Probe 28 is molded or turned from a semi-rigid thermoplastic resin such as a polypropylene, a polycarbonate, or a polyacetal resin which has a softening or distortion point substantially in excess of the boiling point of water so that the sensing unit may be steam sterilized. Thermistor 27 is purposely left exposed and unprotected at the end of probe 28 for reasons that will be explained later. The thermistor leads which may be 10 mil copper wires, and one of which is insulated, are run through the probe 28 and connect therewithin to the ends of cable 29, which may be a two conductor flexible cable such as a tinsel type hearing aid cable, and the other end of which is connected as shown to the plug 31 which may be a two terminal plug of miniature telephone type.

Thermistor 27 consists of a flat layer of fused metal oxides 30 held between two globs of solder 33 and 32 to which the thermistor leads are attached. The flat layer of fused metal oxides 30 may be prepared from any of the mixtures known in the art for use in the preparation of thermistors, such as mixtures of nickel and manganese oxides, or mixtures of ferric, titanium and zirconium oxides.

I have found that the conductivity of the body fluids with which the thermistor element comes into contact during normal use is insufficient to disturb the electrical characteristics of the thermistor element. Accordingly, under the invention the thermistor element is not shielded from contact with such fluids but instead is bare or exposed as shown, and whereby through such direct contact it retains adequate accuracy while gaining improved response.

Under existing manufacturing methods and tolerances the temperature resistance curves of thermistors vary from element to element both in slope and in absolute resistance values, the resistance tolerance being as much as ±20%. I have found that at least four thermistors of the same appropriate composition and for the limited or 10° F. temperature range here concerned, the differences in slope may be ignored. Further, I have discovered a means by which the absolute resistance value of the individual thermistors may be conformed to within a tolerance of ±10 ohms.

The means which I employ to accord the thermistors the same identical resistance value is to reduce the mass of by grinding the elements, as by lapping in a cup of hard abrasive. To facilitate this I mount the thermistor as shown with its tip and substantially all of its external side wall protruding beyond the probe.

For example of the standardizing, the variation in the individual resistances values of the resistor elements produced by conventional manufacturing techniques may yield completed sensing unit resistance values, at, say, 100° F., which vary across the range 400–430 ohms. Under the invention, the thermistor resistance values will be corrected by the aforementioned means to the same or a nominal value which will of course be above but conveniently close to the range. Thus upon assembly of the thermistor probe leads, cable and plug to form the sensing units, I note their resistance readings in a 100° F. temperature bath, and then calibrate the units to the same resistance reading of, say, 432 ohms to within a tolerance of plus or minus one ohm by the aforesaid rotating of the thermistor element in a cup of hard abrasive. In this I may perform the cycle of grinding the thermistor element, and then checking or remeasuring the resistance one or more times as necessary to bring the particular sensing unit to the desired standard reading, here 432±1 ohms.

In this way, I am able to prepare very quickly and very inexpensively a plurality of thermistor sensing units having identical resistance values at 100° F. and the differences in whose slopes across the narrow or ten degree temperature range with which I am concerned may be ignored. Under this invention then the thermistor sensing units are quickly and easily and by merely mechanical means given identical temperature resistance characteristics whereby they are replaceable in a single, or usable interchangeably with multiple, reading units.

The providing novelly of standard or uniform thermistor sensing units will be understood to permit the use of a very simple, rugged, inexpensive, reading unit which, once it has been calibrated, rarely requires recalibration under normal conditions.

Referring now again to the wiring diagram of FIG. 3, the reading unit is seen to be arranged as a Wheatstone bridge in which the thermistor sensing unit 27 is one leg and resistor 19 and temperature indicating potentiometer 17 are the other leg at one side of the bridge. And the connection of null reading ammeter 13 to the center tap of potentiometer 18 divides that as the two legs at the other side of the bridge.

When using a thermistor having a normal resistance of 432±1 ohms at 100° F. and a rate of change of resistance of 15±.01 ohms per degree F. in the range 96–106° F., I find it convenient to employ a potentometer having a full scale resistance of 150 ohms for both the temperature indicating potentiometer 17 and the calibrating potentiometer 18. In order to use as much of the scale of potentiometer 17 as possible, I so adjust dial 12 that the half scale point on the potentiometer (approximately 75 ohms) indicates 101° F., being the midpoint between 96° F. and 106° F. on dial 12. The use of fixed resistor 19, having a nominal value of say 360 ohms, is to approximately balance the leg which includes potentiometer 17 with the leg which includes thermistor 27.

I have found that while there may be some variation in the total resistance of simple wire wound potentiometers, the change in resistance per degree of rotation of the center tap is remarkably uniform for a given series of such potentiometers. Since the change in the resistance of the thermistor is also constant per degree change in temperature, I am able to preprint dial 12 with an appropriate temperature scale. It is of course necessary with any given type of thermistor and with any given series of potentiometers to calibrate the temperature scale initially. In the particular instrument illustrated the full temperature scale from 96° F. to 106° F. occupies about 170° of the periphery of dial 12. Since the change in the resistance of the thermistor within the range 96° to 106° F. is remarkably uniform for the thermistor prepared in the special way disclosed above, and since the change in the resistance for a potentiometer of a given type for a given change in position of the center tap is also remarkably uniform, a single full scale calibration of the temperature dial of a prototype reading unit is sufficient for a series of reading units to be used with a plurality of thermistors.

The use of a single potentiometer to complete the bridge makes it possible to employ relatively inexpensive potentiometers and resistances in the manufacture of the reading unit. Once the unit is assembled, it can be calibrated by: plugging in a precalibrated thermistor sensing unit; heating the thermistor to a known temperature within the range; setting dial 12 to this temperature; and adjusting screw 25 of potentiometer 18 until the needle of ammeter 13 coincides with the indicating null point. In this arrangement, if $R_1$ represents the resistance of that portion of potentiometer 18 which is in parallel with the thermistor sensing unit; if $R_2$ represents the resistance of that portion of potentiometer 18 which is in parallel with potentiometer 17; and if R is the total resistance of potentiometer 18, then, of necessity, $R_1+R_2$ always equals R and, therefore $R_1=R-R_2$. Since the change in resistance of potentiometer 17 over the full scale (96° to 106° F.) change of position of dial 12 is the same as the change of thermistor 27 over the corresponding full scale change of temperature, a single calibration at a single temperature within the range is adequate to calibrate the particular reading unit for all temperatures within the range.

Furthermore, since the reading of the instrument is obtained by null balancing, the reading is not affected by normal variations in the voltage output of the battery; the only thing that is affected by the change in voltage is the sensitivity of the device. This can readily be determined visually, as can the question whether or not the device is working satisfactorily. The particular ammeter selected as the null detector has a full scale deflection from the center balance point to one side or the other for amperes. If the battery output is a full 1.5 v., the ammeter will show a full scale deflection, if dial 12 is set to a reading more than from the actual temperature of the thermistor. As the voltage of the battery decreases, the deflection of the ammeter for a given difference between the setting of dial 12 and the temperature of thermistor 27 decreases. Expressed in other terms, the needle of null detector 13 becomes increasingly sluggish as the voltage output of the battery decreases.

Malfunction of the null detecting ammeter is indicated visually by the fact that the position of the indicator needle is the same when switch 16 is disconnected and the current is off as when the instrument is in use and dial 12 is set to the temperature experienced by the thermistor. The failure of the needle to move when dial 12 is rotated while the instrument is in use, or to return to the exact center position when the current is disconnected, gives a positive visual indication of a malfunction. Since the readings are taken only at the null balancing point the ammeter used for null detector 13 need not be accurate as long as it is sensitive.

The result is a simple, accurate, rugged, clinical thermometer. The reading unit can be used interchangeably with a plurality of thermistor sensing units. A plurality of reading units can be used interchangeably with any of a plurality of thermistor sensing units. Because of its size and shape, the reading unit can easily be carried in a uniform pocket or for extra convenience a lanyard 33 passed through a hole in case 11 and around mounting post 34 can be provided so that the instrument can be worn around the neck.

Since the thermistor sensing units are made entirely of materials that will withstand moisture and elevated temperatures they may readily be sterilized. However, since probe 28 is generally cylindrical and has a tapered head, disposable sheaths of thin elastomeric or plastomeric material may, if desired, be provided as a sanitary protection for the probe while in use.

It should be understood that the present disclosure is for the purpose of illustration only and that this invention includes all modifications and equivalents which fall within the scope of the appended claims.

I claim:

1. A thermistor sensing unit for use with a resistance measuring unit in a resistance type clinical thermometer which is adapted to be calibrated mechanically and which comprises an elongated probe, thermistor lead wires in and extending from said probe, a two conductor flexible cable attached to said lead wires within said probe, said cable extending beyond the end of said probe and terminating in a plug adapted to engage in and cooperate with a receptacle in a resistance measuring unit, and a thermistor mounted in said probe, said thermistor comprising a bare metal oxide layer and means for attaching said thermistor wires to opposite faces of said layer, said thermistor mounted to protrude from said probe to such an extent that the tip and substantially all of the external side walls of said layer are beyond the limits of said probe, whereby the thermistor is adapted to be standardized by engagement with external abrasive means for the removal of material therefrom, whereby the thermistors of different sensing units may thus be calibrated to much closer than manufacturing tolerances.

2. A clinical thermometer having an electrical resistance type temperature sensing unit adapted to be placed in contact with a patient, and in combination therewith a temperature reading unit comprising a compact case shaped to fit conveniently in the palm of the hand; means for detecting and including an indicator visible through the front face of said casing for signalling the resistance changes of said temperature sensing unit; a temperature dial rotatively mounted at the front face of said case, said dial projecting and proportioned to be grasped and manipulated by the fingers of the hand holding the case, said dial arranged also by its said finger manipulation to adjust said resistance detecting means whereby the temperature sensed may be found from the positional relationship of said dial to said visible indicator, and whereby also the temperature reading is preserved upon removal of the sensing unit from, and may be compared and rechecked upon reapplication of said sensing unit to, the patient; a switch positioned at the back of the casing, said switch arranged normally to deactivate and squeezable by the same case holding hand to activate said sensing unit resistance detecting means; and means for removably coupling said sensing unit to said casing and thereby to said detecting means.

References Cited

UNITED STATES PATENTS

| | | | |
|---|---|---|---|
| 3,045,488 | 7/1962 | Jurs et al. | 73—362 |
| 3,082,625 | 3/1963 | Zimmerman | 73—362 |
| 3,117,448 | 1/1964 | Gilmont et al. | 73—362 |
| 3,339,414 | 9/1967 | Coor | 73—362 |
| 3,139,753 | 7/1964 | Brudner | 73—362 |
| 3,377,862 | 4/1968 | Gheorghiu | 73—362 |

FOREIGN PATENTS 149,600     U.S.S.R.

OTHER REFERENCES

Cook, J. C. et al.: Fast-Response Thermistor Probes, in The Rev. of Sci. Instruments, vol. 34, No. 5, May 1963, pp. 496–7.

LOUIS R. PRINCE, Primary Examiner.

FREDERICK SHOON, Assistant Examiner.

U.S. Cl. X.R.

323—75; 338—28